(12) United States Patent
Rajendran et al.

(10) Patent No.: US 8,832,011 B2
(45) Date of Patent: *Sep. 9, 2014

(54) ELECTRONIC SYNAPSES FROM STOCHASTIC BINARY MEMORY DEVICES

(75) Inventors: Bipin Rajendran, New York, NY (US); Mark B. Ritter, Sherman, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,722

(22) Filed: Sep. 12, 2012

(65) Prior Publication Data

US 2013/0173515 A1    Jul. 4, 2013

Related U.S. Application Data

(63) Continuation of application No. 13/343,371, filed on Jan. 4, 2014.

(51) Int. Cl.
*G06N 3/04*    (2006.01)
*G06N 3/00*    (2006.01)
*G06N 3/063*   (2006.01)

(52) U.S. Cl.
CPC .............. *G06N 3/0635* (2013.01); *G06N 3/04* (2013.01)
USPC ............................................. 706/38; 706/27

(58) Field of Classification Search
CPC ... G06N 3/0635; G06N 3/06354; G06N 3/04; G06N 3/06
USPC .............................................. 706/26–27, 38
See application file for complete search history.

(56) References Cited

U.S. PATENT DOCUMENTS

| 5,187,680 | A | | 2/1993 | Engeler |
| 5,255,362 | A | * | 10/1993 | Brandstetter et al. ........... 706/40 |
| 5,381,516 | A | | 1/1995 | Devos et al. |
| 7,978,510 | B2 | | 7/2011 | Modha et al. |
| 2010/0220523 | A1 | | 9/2010 | Modha et al. |
| 2011/0004579 | A1 | | 1/2011 | Snider |
| 2011/0119214 | A1 | | 5/2011 | Breitwisch et al. |
| 2011/0119215 | A1 | | 5/2011 | Elmegreen et al. |
| 2011/0153533 | A1 | | 6/2011 | Jackson et al. |

OTHER PUBLICATIONS

International Search Report; International filing date Nov. 26, 2012; date of mailing Feb. 5, 2013; international application No. PCT/US12/66502; 8 pages.
Written Opinion of the International Searching Authority; International filing date Nov. 26, 2012; date of mailing Feb. 5, 2013; international application No. PCT/US12/66502; 5 pages.

(Continued)

*Primary Examiner* — Jeffrey A Gaffin
*Assistant Examiner* — Benjamin Buss
(74) *Attorney, Agent, or Firm* — Cantor Colburn LLP; Vazken Alexanian

(57) ABSTRACT

According to a technique, an electronic device is configured to correspond to characteristic features of a biological synapse. The electronic device includes multiple bipolar resistors arranged in parallel to form an electronic synapse, an axonal connection connected to one end of the electronic synapse and to a first electronic neuron, and a dendritic connection connected to another end of the electronic synapse and to a second electronic neuron. An increase and decrease of synaptic conduction in the electronic synapse is based on a probability of switching the plurality of bipolar resistors between a low resistance state and a high resistance state.

7 Claims, 14 Drawing Sheets

(56) References Cited

OTHER PUBLICATIONS

S.H. Jo et al., "Nanoscale Memrister Device as Synapse in Neuromorphic Systems," Nano Lett., vol. 10, 2010, No. 4, pp. 1297-1301.

Y. Pershin et al., "Neuromorphic, Digital and Quantum Computation with Memory Circuit Elements," arXiv: 1009.6025v2[cond-mat.mes-hall], Apr. 30, 2001, pp. 1-9.

G.S. Snider, "Spike-Timing-Dependent Learning in Memristive Nanodevices," 2008 IEEE International Symposium on Nanoscale Architectures, Nanoarch, 2008, pp. 85-92.

S. Yu, et al., "An Electronic Synapse Device Based on Metal Oxide Resistive Switching Memory for Neuromorphic Computation," IEEE Transactions on Electron Devices, vol. 58, No. 8, Aug. 2011.; pp. 2729-2737.

* cited by examiner

| | ΔT > 0 | | ΔT < 0 | |
|---|---|---|---|---|
| | # OF OFF DEVICES | # OF ON DEVICES | # OF OFF DEVICES | # OF ON DEVICES |
| INITIAL | $k$ | $N-k$ | $k$ | $N-k$ |
| FIRST PULSE $p_1$ | $(1-p_1)k$ | $p_1 k + N - k$ | $p_1(N-k) + k$ | $(1-p_1)(N-k)$ |
| SECOND PULSE $p_2$ | $(1-p_1)k +$ $p_2(p_1 k + N - k)$ | $(1-p_2)(p_1 k + N - k)$ | $(1-p_2)(p_1(N-k) + k)$ | $(1-p_1)(N-k) +$ $+ p_2 p_1(N-k) + k)$ |
| FINAL | $p_2 N +$ $(1-p_1)(1-p_2)k$ | $(1-p_2)N -$ $(1-p_1)(1-p_2)k$ | $p_1(1-p_2)N +$ $(1-p_1)(1-p_2)k$ | $[1 - p_1(1-p_2)]N -$ $(1-p_1)(1-p_2)k$ |
| IF $p_1 = 1$ | $p_2 N$ | $(1-p_2)N$ | $(1-p_2)N$ | $p_2 N$ |

FIG. 8

ELECTRONIC SYNAPSES FROM STOCHASTIC BINARY MEMORY DEVICES

CROSS-REFERENCE TO RELATED APPLICATIONS AND PRIORITY CLAIM

This application is a continuation of U.S. Non-Provisional application Ser. No. 13/343,371, entitled "ELECTRONIC SYNAPSES FROM STOCHASTIC BINARY MEMORY DEVICES", filed Jan. 4, 2012, which is incorporated herein by reference in its entirety.

BACKGROUND

Exemplary embodiments relate to an electronic synapse, and more particularly to, an electronic synapse utilizing bipolar devices.

Neuromorphic systems, also referred to as artificial neural networks, are computational systems that permit electronic systems to essentially function in a manner analogous to that of a biological brain. Neuromorphic systems do not generally utilize the traditional digital model of manipulating (zeros) 0's and (ones) 1's. Instead, neuromorphic systems create connections between processing elements that are roughly functionally equivalent to neurons of a biological brain. Neuromorphic systems may be comprised of various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of individual experiences of a human is stored in conductance of the synapses. The synaptic conductance changes with time as a function of the relative spike times of pre-synaptic and post-synaptic neurons, as per spike timing dependent plasticity (STDP). The STDP rule increases the conductance of a synapse if its post-synaptic neuron fires after its pre-synaptic neuron fires, and decreases the conductance of a synapse if the order of the two firings is reversed. Furthermore, the change depends on the precise delay between the two events, such that the more the delay, the less the magnitude of change.

BRIEF SUMMARY

According to an exemplary embodiment, a method for configuring an electronic device to correspond to characteristic features of a biological synapse is provided. The method includes arranging a plurality of bipolar resistors in parallel to form an electronic synapse, connecting an axon connection to one end of the electronic synapse and to a first electronic neuron, and connecting a dendritic connection to another end of the electronic synapse and to a second electronic neuron. An increase and decrease of synaptic conduction in the electronic synapse is based on a probability of switching the plurality of bipolar resistors between a low resistance state and a high resistance state.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 8 is a chart showing the effect of probabilistic switching is that the final resistance after the application of a pulse is dependent on the initial state of the bipolar resistor, and not just the spike timing difference according to an exemplary embodiment.

DETAILED DESCRIPTION

A nanoscale synaptic device capable of storing multiple resistance levels based on spike intervals of neuron pairs is considered the foundation for building neuromorphic circuits. A commonly observed behavior in biological synapses thought to be necessary for learning is spike timing dependent plasticity (STDP).

This disclosure provides a technique for obtaining STDP characteristics (i.e., behavior) from bipolar memory devices according to exemplary embodiments. Bipolar devices are characterized by discrete states, such as on and off, or high (resistance) and low (resistance), which is in contrast to analog devices. They are turned on and off by voltage pulses of opposite polarity.

Regarding biological characteristics of SDTP, there is an intrinsic rectifying action in information transmission, because different molecules are involved at the axon and dendrite. However, according to certain models, all that the synapse has to modify its strength (i.e., conductance) is the history of a spike from pre and post neuron. It is conceivable that spikes cause some chemical change at both the axon and dendrite, whose activity decay with some time constant. Thus, the synapse has to be receptive to potentials appearing at the axon and dendrite (connections). From an electronic perspective, this means that the resistor (coinciding to the synapses) is bipolar and not unipolar according to exemplary embodiments as discussed further herein. Potential (voltage) from both pre and post neurons should be used to implement STDP.

Certain metal/insulator/metal devices exhibit bipolar current (I) to voltage (V) characteristics as understood by one skilled in the art. As such, at a certain positive voltage, they turn on, and at a certain negative voltage, they turn off. For example, consider an electronic synapse candidate which can be a bipolar memory device made of silver (Ag) with silver sulfide ($Ag_2S$) formed around the silver, and with a platinum (Pt) electrode as understood by one skilled in the art.

Figure 1:
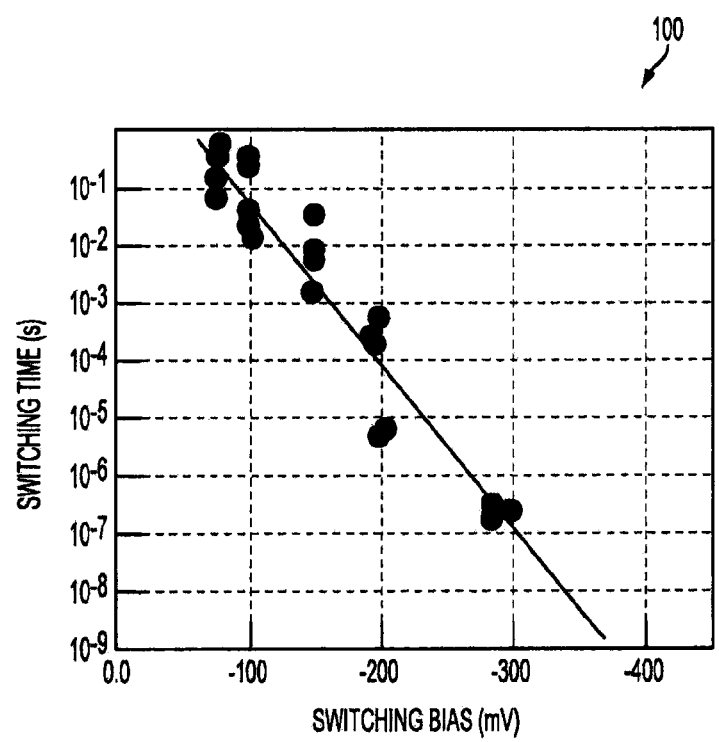
FIG. 1 illustrates a chart showing the switching time on the y-axis versus the switching bias on the x-axis for different memory devices.

This memory device can be modeled in the following manner. If a fixed pulse interval is assumed, say 1 μs (microsecond), the memory device will require about +250 mV (millivolts) to turn on and about −250 mV to turn off. If the applied voltage is below this magnitude (250 mV), the memory device needs longer time to switch. One simple way to model this is to assume that the probability of switching decreases as the magnitude of the applied voltage decreases, which will be utilized further herein. FIG. 1 illustrates a chart 100 showing the switching time on the y-axis versus the switching bias (applied voltage) on the x-axis for a memory device. As can be seen, at lower voltages, more time is needed to switch the memory devices on.

Figure 2:
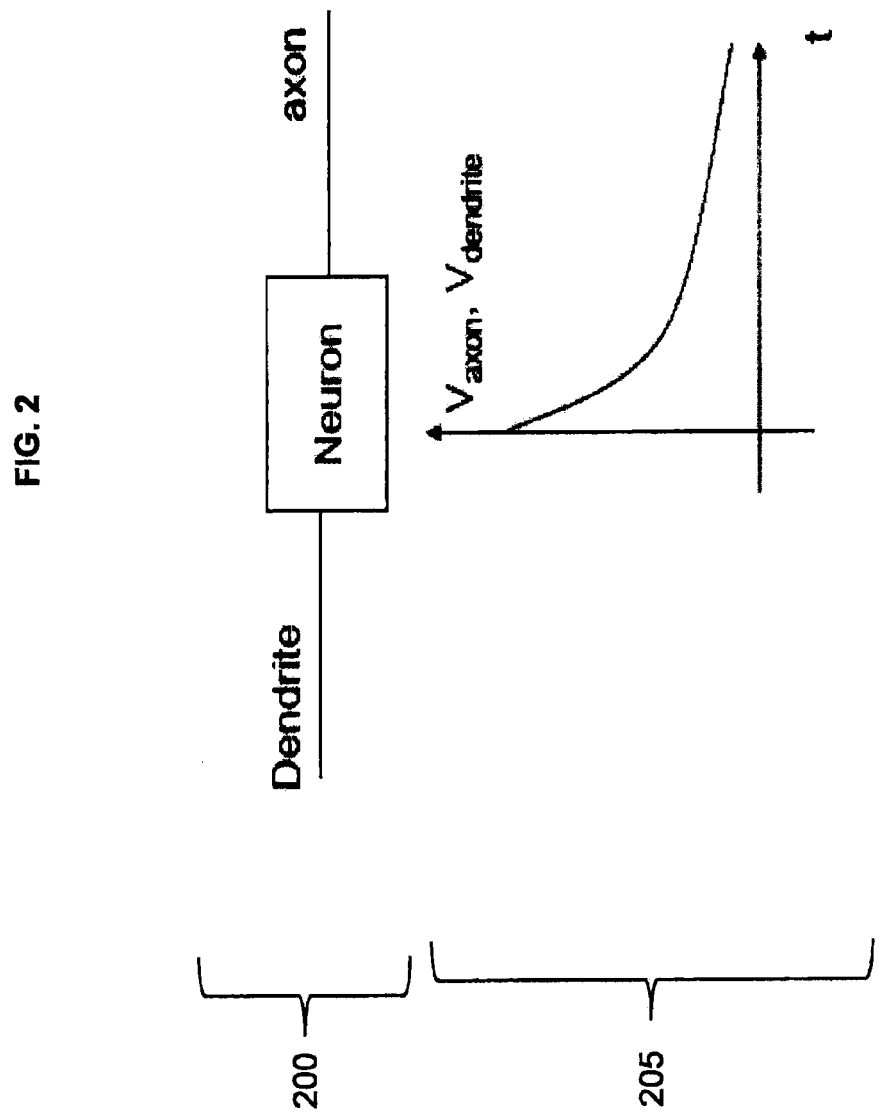
FIG. 2 is a block diagram of a neuron with a dendrite terminal and an axon terminal, along with a graph of the axon voltage and dendrite voltage versus time.

Now, turning to FIG. 2, a block diagram 200 of a neuron is shown with a dendrite (terminal) and an axon (terminal), along with a graph 205 of the axon voltage and dendrite voltage versus time.

When the neuron spikes, the spiking neuron creates a potential (voltage) on all its terminals (axons and dendrites), which decay with some time constant. It is the co-joint action of such potential of the axon and dendrite that results in programming the synapse according to exemplary embodiments. The disclosure shows and explains how a bipolar device is uniquely suited (and will be utilized) to exploit this spiking nature of neurons to implement STDP.

Figure 3:
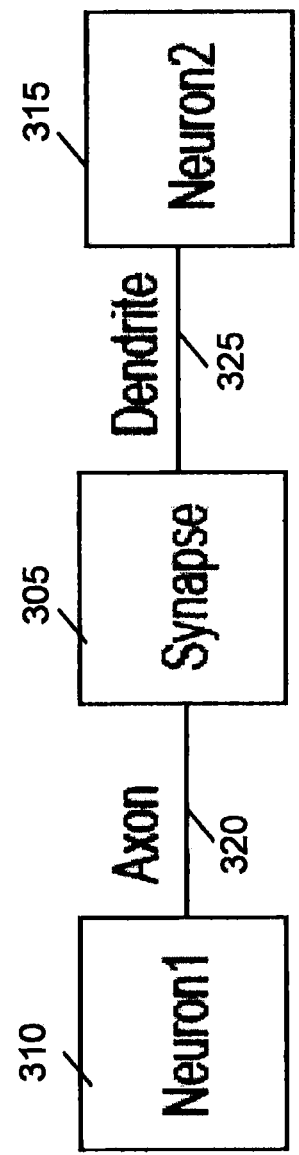
FIG. 3 is a block diagram of an electronic synapse connection according to an exemplary embodiment.

FIG. 3 is a block diagram 300 of an electronic synapse according to an exemplary embodiment. A simplified version is shown for a synapse 305 connected to "neuron 1" 310 on axon connection 320 and to "neuron 2" 315 on dendrite connection 325, while the detailed circuit is discussed in FIG. 11. Reference can be made to FIG. 3, when discussing FIGS. 4A, 4B, and 4C and when discussing FIGS. 5A, 5B, and 5C.

Figure 4A:
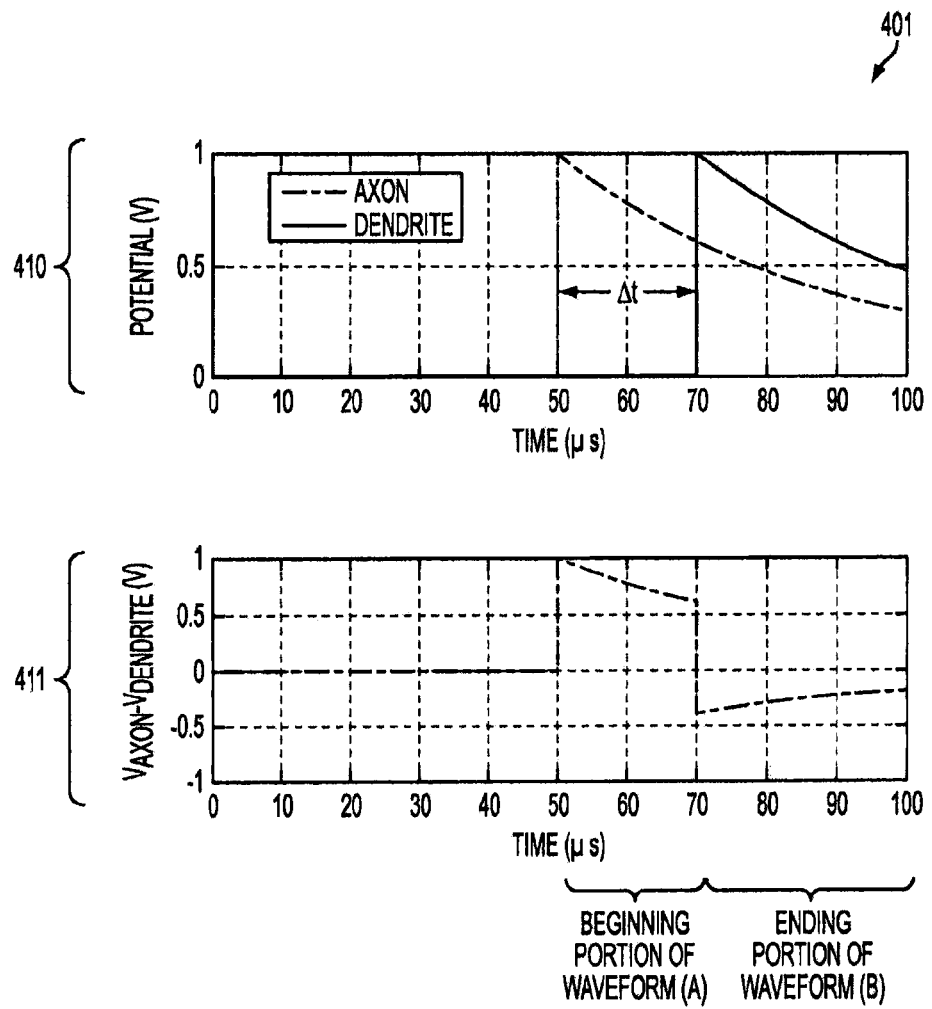
FIG. 4A is a graph illustrating how spike timing dependent plasticity (STDP) is implemented based on bipolar resistors according to an exemplary embodiment.
Figure 4B:
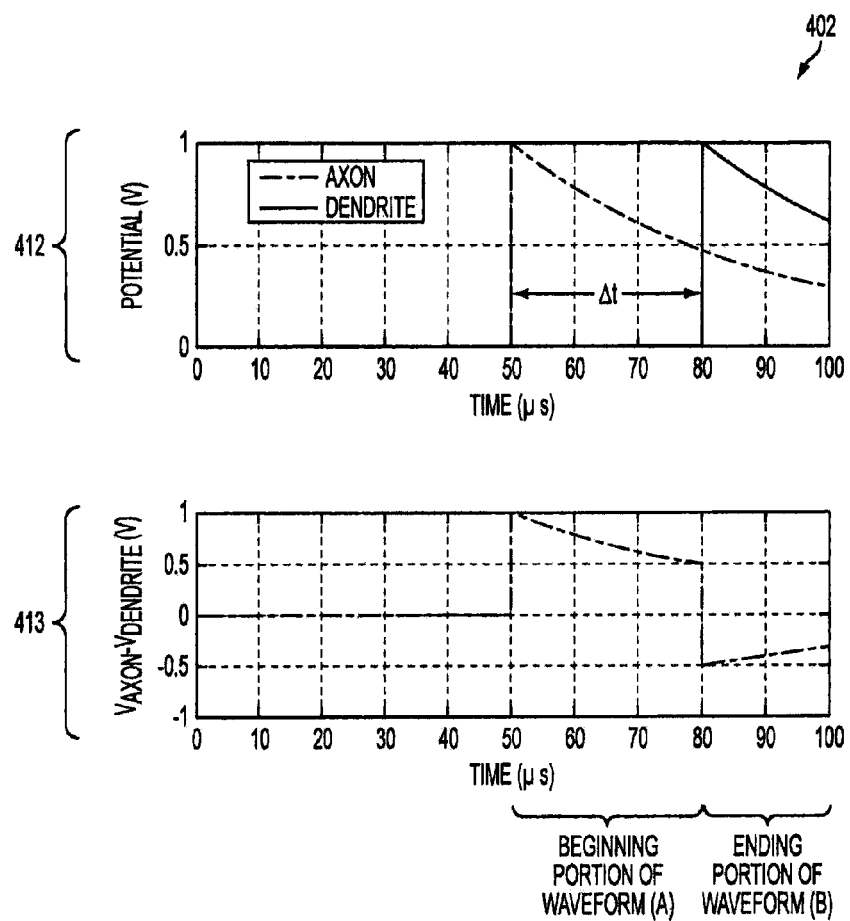
FIG. 4B is a graph illustrating how spike timing dependent plasticity is implemented based on bipolar resistors according to an exemplary embodiment.
Figure 4C:
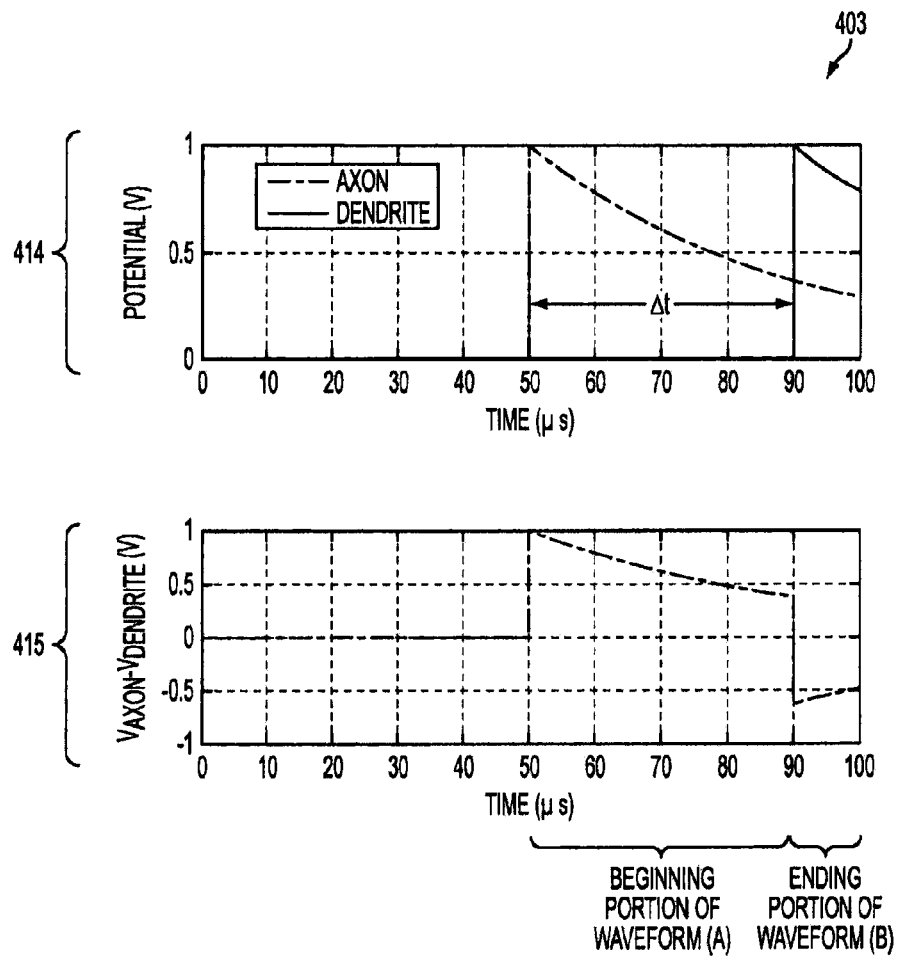
FIG. 4C is a graph illustrating how spike timing dependent plasticity is implemented based on bipolar resistors according to an exemplary embodiment.

FIGS. 4A, 4B, and 4C (collectively referred to as FIG. 4) illustrate how spike timing dependent plasticity (STDP) is implemented based on bipolar resistors (and/or bipolar memory devices) according to an exemplary embodiment. For illustration purposes, FIGS. 4A, 4B, and 4C illustrate three different example cases 401, 402, and 403. Each of the cases 401, 402, and 403 shows respective voltages spiking on the axon and dendrite at different times, along with the resultant voltage (effect on the synapse 305) in graphs 411, 413, and 415.

For FIGS. 4A, 4B, and 4C, it may be assumed that neuron 1 spikes at, e.g., 50 us, and neuron 2 spikes after delay delta t (+Δt) of neuron 1, where (delay time) $\Delta t = t_D - t_A$. The spike on dendrite 325 is at time D ($t_D$) and the spike on axon 320 is at time A ($t_A$).

Graphs 410, 412, and 414 plot the magnitude of the voltage pulse issued by neuron 1 (when it spikes, here assumed to be 50 us) on the axon to the synapse versus the time of input (μs). After the delay (Δt), neuron 2 spikes, and the voltage pulse from neuron 2 on the dendrite is shown in graphs 410, 412, and 414 for the three cases. As seen by the synapse 305, the resultant voltage is shown in graphs 411, 413, and 415, which plots the voltage$_{axon}$-voltage$_{dendrite}$ ($V_{axon} - V_{dendrite}$) versus the time.

The synapse 305 is programmed according to $V_{axon} - V_{dendrite}$. In the graphs 411, 413, and 415, initially, the resultant voltage is positive for a certain duration, Δt (i.e., the time between the spike on the axon and the spike on the dendrite). This will turn on the synapse 305 with a probability (denoted as $p_1$). This is followed by a time interval when the resultant waveform is negative in graphs 411, 413, and 415, where each of the negative voltages start respectively at times 70 μs, 80 μs, and 90 μs. The magnitude of negative voltage waveform depends on Δt (i.e., the time between the spike on the axon and the spike on the dendrite). As Δt increases, notice that the magnitude of the negative waveform increases from graphs 411 to 413 through graphs 413 to 415. Thus, the probability of turning the bipolar resistor off (denoted as $p_2$) increases with a larger and larger Δt (i.e., as Δt increases). The final state of the bipolar memory device depends on both the probabilities $p_1$ and $p_2$. This is one part of the desired spike timing dependent plasticity according to exemplary embodiments.

Figure 5A:
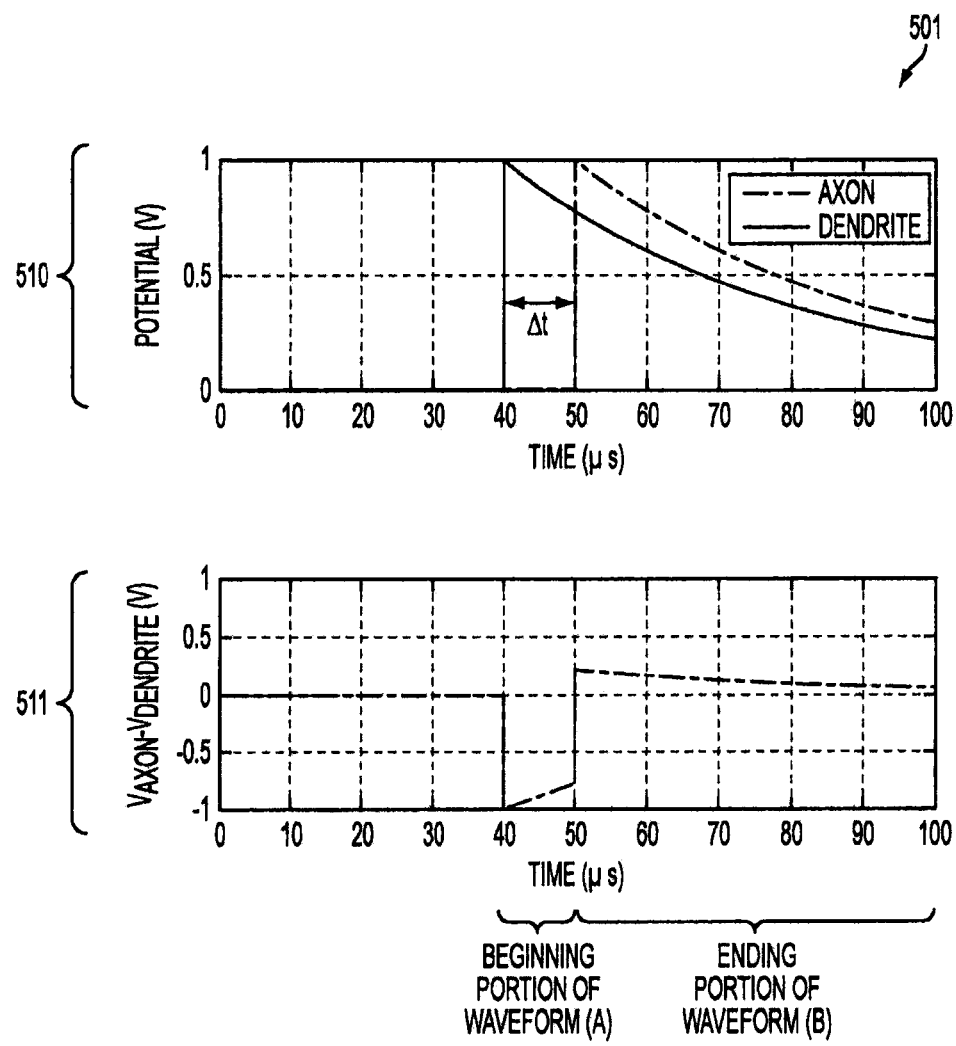
FIG. 5A is a graph illustrating how spike timing dependent plasticity (STDP) is implemented based on bipolar resistors when the voltage spike occurs on the dendrite before the axon according to an exemplary embodiment.
Figure 5B:
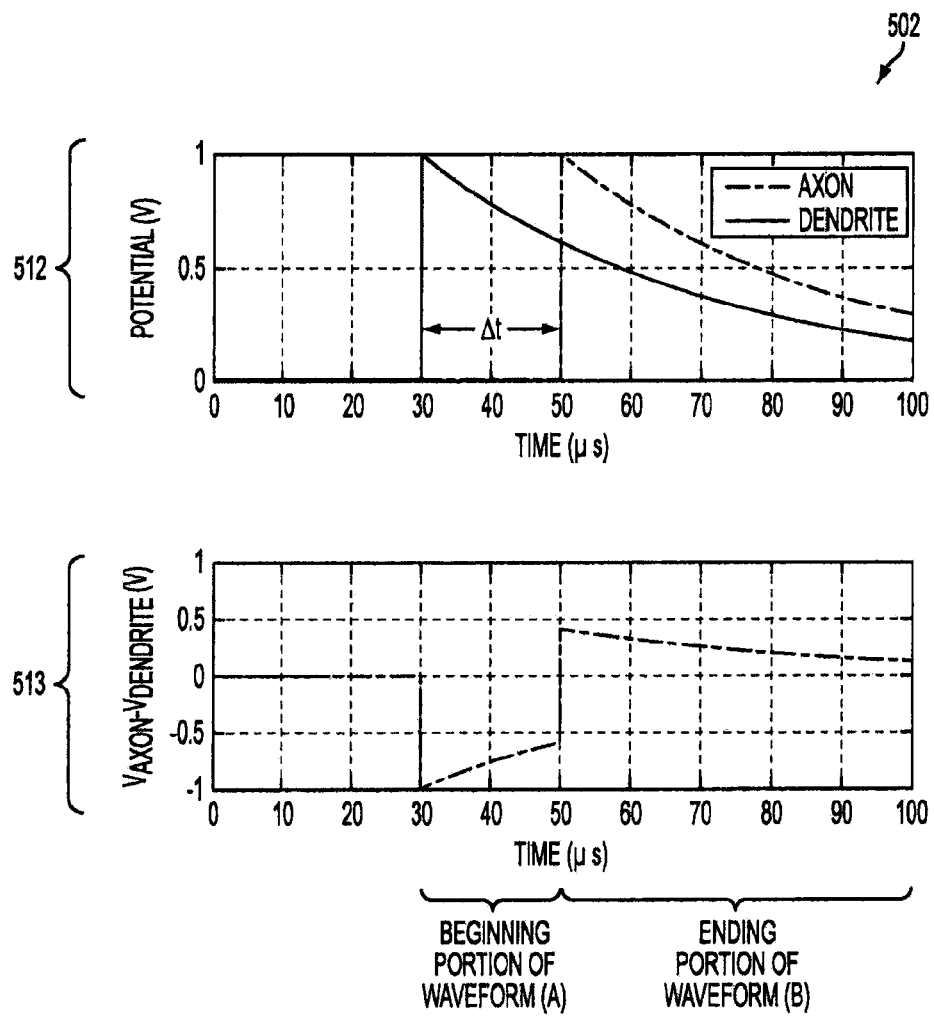
FIG. 5B is a graph illustrating how spike timing dependent plasticity is implemented based on bipolar resistors when the voltage spike occurs on the dendrite before the axon according to an exemplary embodiment.
Figure 5C:
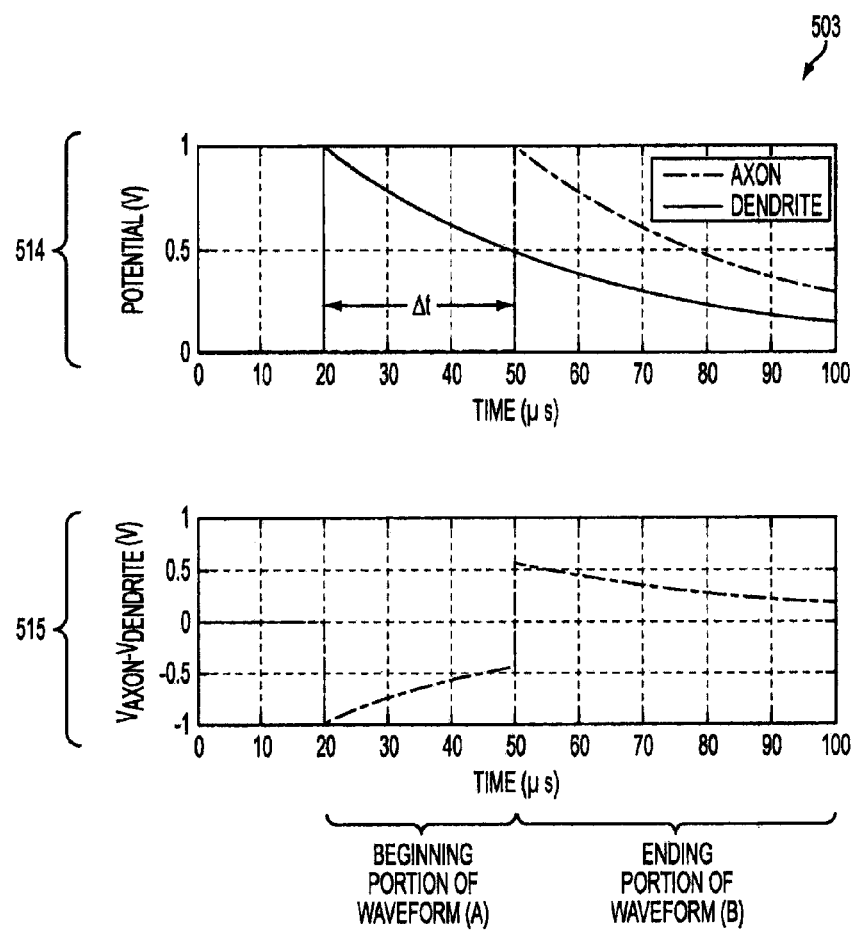
FIG. 5C is a graph illustrating how spike timing dependent plasticity is implemented based on bipolar resistors when the voltage spike occurs on the dendrite before the axon according to an exemplary embodiment.

Now, turning to FIGS. 5A, 5B, and 5C (collectively referred to as FIG. 5), it is illustrated how spike timing dependent plasticity (STDP) is implemented based on bipolar resistors (and/or bipolar memory devices) when the voltage spike occurs on the dendrite before the axon according to an exemplary embodiment. Again, for illustration purposes, FIGS. 5A, 5B, and 5C illustrate three different example cases 501, 502, and 503.

For FIGS. 5A, 5B, and 5C, it may be assumed that neuron 1 spikes at, e.g., and neuron 2 spikes before delta t (i.e., Δt) time of neuron 1, where $\Delta t = t_D - t_A$. Note that now Δt is negative. This means that the neuron 2 spikes before neuron 1 spikes. The voltage pulse on dendrite 325 is issued at time D ($t_D$) and the voltage pulse on axon 320 is issued at time A ($t_A$).

Graphs 510, 512, and 514 plot the magnitude of the voltage pulse for neuron 1 on the axon to the synapse versus the time of input (μs). For Δt prior to the spike for neuron 1, the voltage pulse from neuron 2 appears on the dendrite 2, as shown in graphs 510, 512, and 514 for the three cases 501, 502, and 503. As seen by the synapse 305, the resultant voltage (resultant conductance) is shown in graphs 511, 513, and 515, which plots voltage$_{axon}$-voltage$_{dendrite}$ ($V_{axon} - V_{dendrite}$) versus the time.

As mentioned above, the synapse is programmed according to $V_{axon} - V_{dendrite}$. In the graphs 511, 513, and 515, resultant voltage is negative for a certain duration, Δt (i.e., the time between the spike on the axon and the spike on the dendrite). This will turn the synapse 305 off with a probability (denoted as $p_1$). This is followed by a time interval when the resultant waveform is positive, starting at 50 μs. The magnitude of the part of the resultant voltage depends on Δt. As Δt increases (which is actually a negative (pre) value or −Δt from the perspective of neuron 1 on axon 320), notice that the magnitude of the positive pulse increases from graphs 511 to 513 through graphs 513 to 515. Thus, the probability of turning the bipolar resistor on (denoted as $p_2$) increases with a larger and larger Δt (i.e., as Δt increases). The final state of the bipolar memory device depends on both the probabilities $p_1$ and $p_2$. This is the second part of the desired STDP.

With respect to FIGS. 4A, 4B, 4C and FIGS. 5A, 5B, 5C, the upper graphs 410, 412, 414, and 510, 512, 514 show the times in which the voltages spike on the axon and dendrite, while the corresponding results voltage (effect) is respectively shown in lower graphs 411, 413, 415 and 511, 513, 515.

It is assumed that there is a critical time for bipolar device switching that follows an example curve in graph 100 shown in FIG. 1. The critical time $\tau_c$ is defined as the time required for a square pulse to achieve 63% probability of switching. For example, as seen in FIG. 1, at 200 mV (millivolts) the critical time $\tau_c$ is approximately 100 μs ($100 \times 10^{-6}$) for the bipolar device to switch from one state to the other.

Now, the stochastic behavior will be modeled to move from (resultant) voltages to probability (for the bipolar device). It is further assumed that the probability of switching for an infinitesimal (resultant voltage) pulse with time duration (say Δ) less than $\tau_c$ will decay exponentially. From this, the probability density function (pdf) can be written for an infinitesimal square pulse of amplitude v, and duration Δ as:

$$P(v,\Delta) = 1/(v \cdot \tau_c) \exp[-(\Delta/\tau_c)].$$

So that, for a square pulse of amplitude v and time duration $t_a$ $$\int_0^{t_a} v P(v, dt) dt = 1 - \exp[-(t_a/\tau_c)].$$

Figure 7:
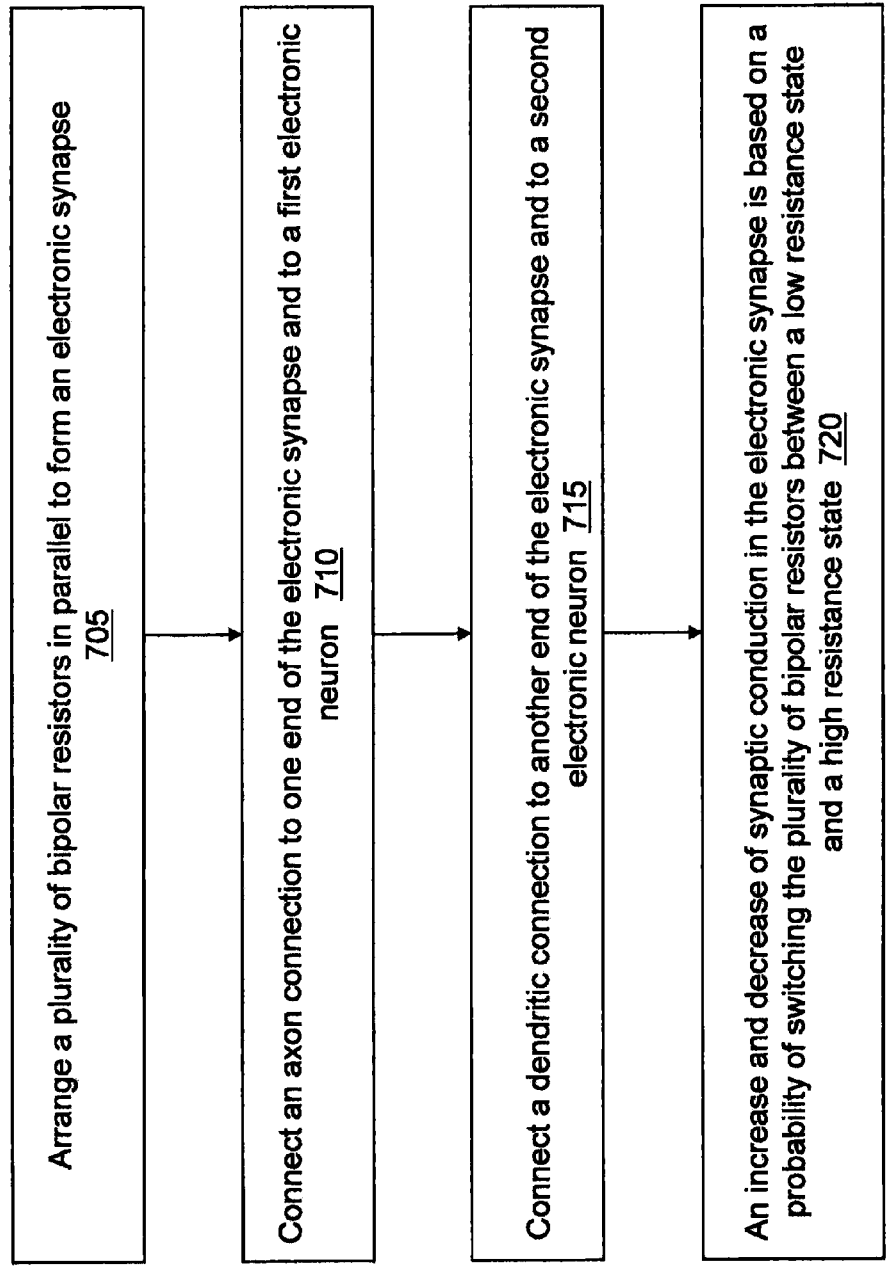
FIG. 7 is a method of configuring one or more electronic synapses to correspond to characteristic features of a biological synapse according to an exemplary embodiment.

Note that when $t_a = \tau_c$, the probability P=0.63. With this definition, the probability of switching for arbitrary waveforms v(t) is further explained. For an arbitrary waveform v(t), the probability of switching can be obtained by integration of the pdf with the waveform v(t), as shown in FIG. 7 for the equation $$\int_0^\infty v(t) P(v(t), dt) dt.$$

Figure 6:
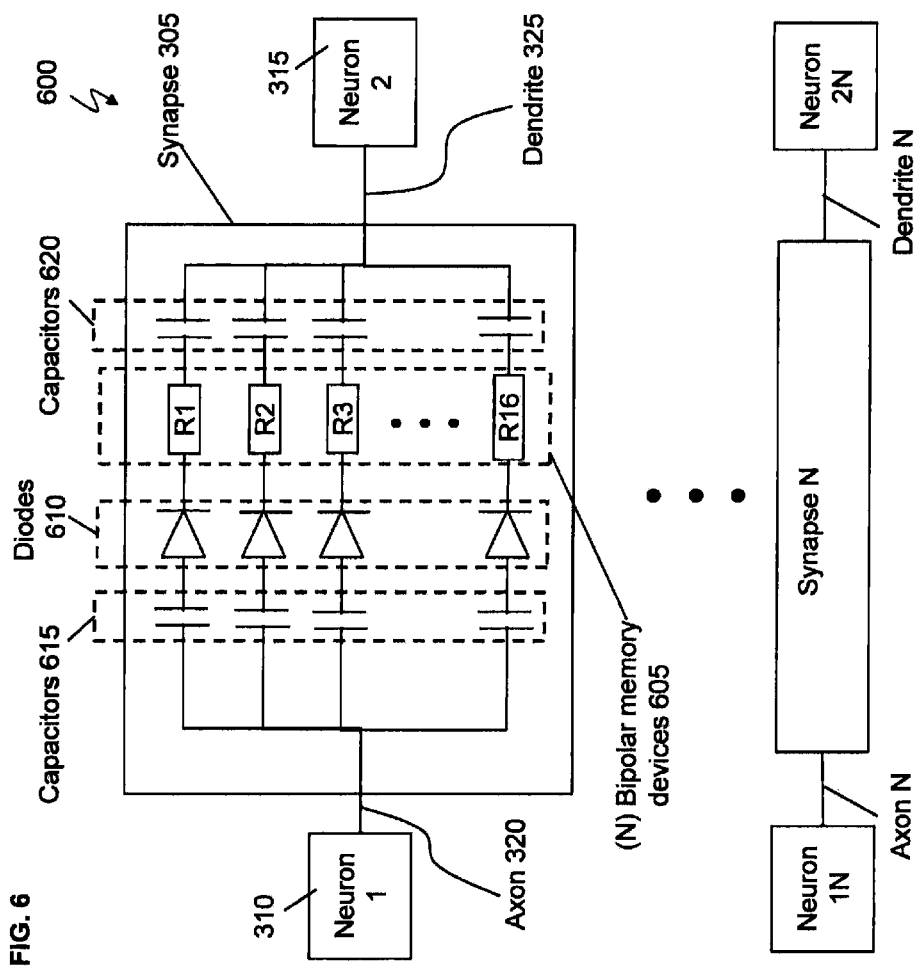
FIG. 6 illustrates a circuit for an array of electronic devices according to an exemplary embodiment.

The electronic synapse in an exemplary embodiment may comprise multiple bipolar resistors that are connected in parallel (as illustrated in FIG. 6). Based on the value of Δt, only a fraction of these bipolar resistors will undergo switching, when the two neurons spike and a resultant voltage appears across them. In a chart 800 in FIG. 8, the total number of bipolar resistors in a synapse is assumed to be N, the number of bipolar resistors that are in the off state before the spiking events of the two neurons is assumed to be k, and the number of bipolar resistors that are in the on state before the spiking events of the two neurons is assumed to be (N−k). Also, $p_1$ and $p_2$ correspond to the switching probability during the two parts of the resultant waveform as discussed with respect to explaining FIGS. 4A, 4B, and 4C, and FIGS. 5A, 5B, and 5C.

According to an exemplary embodiment, FIG. 8 is the chart 800 showing the effect of this probabilistic switching on an array of bipolar resistors that form the electronic synapse (e.g., sixteen bipolar resistors in parallel as shown in FIG. 6). The final number of on bipolar resistors in the synapse depends on the initial state of the bipolar resistor, and not just the spike timing difference.

In the graph 900, the effective probability for switching the synapse is shown on the y-axis and the delay in time Δt between spikes (e.g., on the axon and dendrite via neuron 1 and 2). In the graph 900, the probability $P_1$ corresponds to the probability of switching during the beginning portion of the waveform in graphs 411, 413, 415 and 511, 513, 515. The probability $P_2$ corresponds to the probability of switching during the ending portion of the waveform in graphs 411, 413, 415 and 511, 513, 515.

Figure 9:
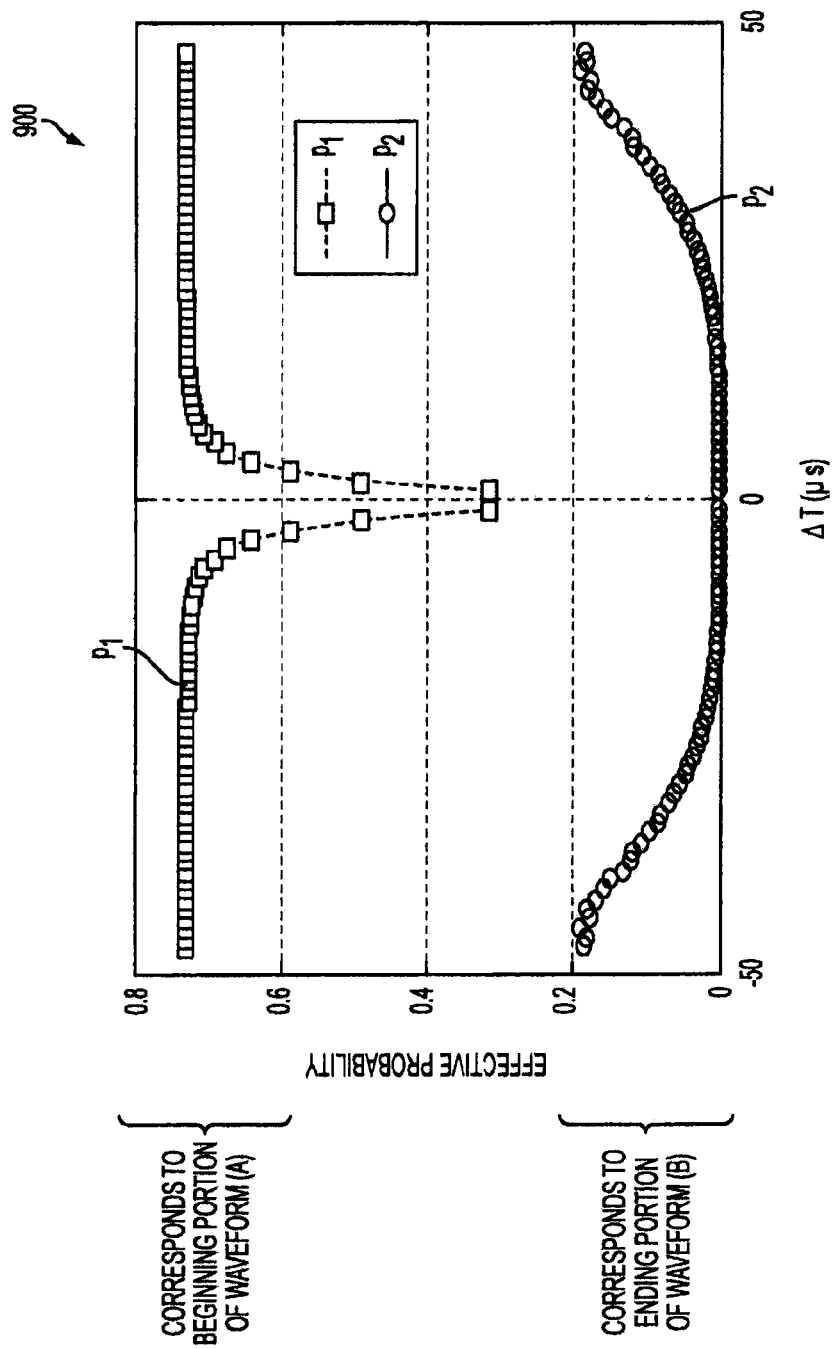
FIG. 9 is a graph of the probability of switching with two pulses according to an exemplary embodiment.

FIG. 9 illustrates a graph 900 of the probability $p_1$ and $p_2$ of switching with the resultant voltage pulses corresponding to FIGS. 4A, 4B, and 4C (ΔT>0) as well as FIGS. 5A, 5B, and 5C (ΔT<0). When (ΔT>0), the resistor turns on with probability $p_1$ and turns off with probability $p_2$. When (ΔT<0), the resistor turns off with probability $p_1$ and turns on with probability $p_2$.

Now, turning to FIG. 6 which is a circuit for an array of electronic devices, a block diagram of a system 600 illustrates the synapse (circuits) according to an exemplary embodiment. The synapse 305 is configured to correspond to biological characteristics of a biological synapse, and the effective conductance generally changes according to graph 1000 in FIG. 10 (based on the probability of switching in the graph 900).

The synapse 305 is formed with multiple (1–N) bipolar devices 605 in which all of the bipolar devices 605 are connected in parallel to one another, where N is the last of the bipolar devices 605. According to an implementation, the bipolar devices 605 are sixteen bipolar resistors R1-R16 each connected in parallel. As a non-limiting example, each bipolar resistor may have a low resistance state of, e.g., 1 K (kilo) ohm and a high resistance state of, e.g., 100 K ohms. The synapse 305 includes diodes 610 which limit current flow to one direction. Also, the capacitors 615 and 620 are connected at opposite ends of the synapse 305.

The neurons 1 and 2 respectively spike (voltage) on the axon 320 and the dendrite 325 of the synapse 305. The each bipolar resistor in the synapse 305 is configured to have a resulting magnitude of effective voltage and/or a resulting magnitude of effective conduction (G) based on the combined voltages received on the axon 320 and the dendrite 325. The magnitude of effective voltage and/or resulting magnitude of conduction for the synapse 305 changes based on the voltage received on the axon and the voltage received on the dendrite, which in turn determines the probability of switching for the bipolar resistors.

In one implementation, it is assumed that each of bipolar devices 605 are identical and has the same characteristics such as the same resistance, the same high resistance and low resistance states, the same required switching voltage, etc. The neurons 1 and 2 are configured to operate to generate voltage spikes to cause an effective (resultant) voltage below the required switching voltage for the bipolar resistors such that the bipolar resistors of the synapse switch according to a probability as discussed herein.

The bipolar devices 605 may be programmable resistive memory devices that switch between a first state (e.g., low resistance state or off) and a second state (high resistance state or on). Also, the programmable resistive memory devices can be programmed to have a desired resistance for the first state and a different desired resistance for the second state.

The system 600 also shows neurons 1N, axon N, synapse N, dendrite N, and neuron 2N respectively corresponding to numerous neurons 1, axons 320, synapses 305, dendrites 325, and neurons 2, all of which form an array of (bipolar devices) electron devices as discussed herein.

According to an exemplary embodiment, each binary device may be built of insulating material that is sandwiched between two metal electrodes; the typical insulating materials used are binary oxides of metals such as Ni, Ti, Zr, Cu, etc., transition metal oxides such as $Pr_{0.7}Ca_{0.3}MnO_3$, $SrZrO_3$, SrTiO$_3$, or solid state electrolytes such as GeSe$_{1-x}$, Ag$_2$S, Cu$_2$S, etc. The typical electrodes used may be Pt, Ti, Ag, Cu, etc.

Figure 10:
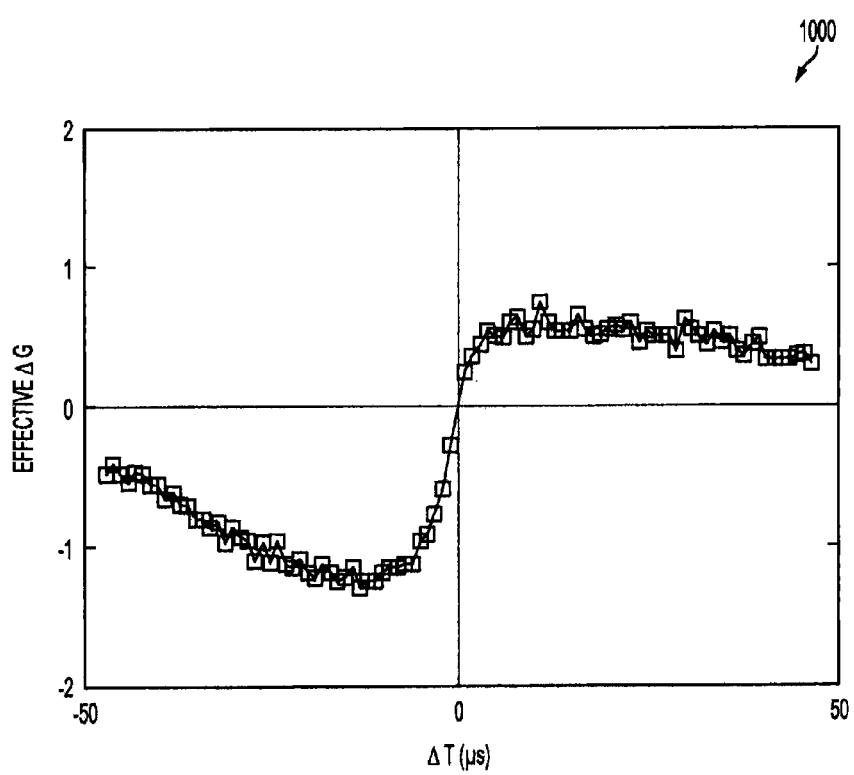
FIG. 10 is a graph of spike timing dependent plasticity based on Monte Carlo simulations for an electronic synapse according to an exemplary embodiment.

FIG. 10 is a graph 1000 of STDP based on Monte Carlo simulations (for the electronic synapse 305 connected to a pair of electronic neurons as shown in FIG. 6) according to an exemplary embodiment. The effective change in conductance G is on the y-axis plotted versus Δt, and the delay between the spiking events of neuron 1 and neuron 2 on the x-axis. Electrical conductance measures how easily electricity flows along a certain path, and is defined as G=1/R, where R is (total) resistance.

The graph 1000 shows the median effective change of over 50,000 random spike timing differences (between neurons 1 and 2) received by the synapse (implemented by 16 parallel bipolar resistors). The average behavior of the synapse (bipolar resistors) corresponds to a biological synapse. Accordingly, for any delay Δt between voltage spikes whether positive (neuron 1 spikes first) or negative (neuron 2 spike first), the effect conductance change the synapse 305 undergoes is shown in graph 1000. For positive Δt, the effective conductance of the electronic synapse increases, while for negative Δt, the effective conductance of the electronic synapse decreases. The magnitude of change in conductance is larger for smaller values of |Δt|.

FIG. 7 illustrates a method 700 of configuring one or more electronic synapses 305 to correspond to characteristic features of a biological synapse according to an exemplary embodiment.

Multiple bipolar resistors are arranged in parallel to form an electronic synapse 305 (as shown in FIG. 6) at block 705. An axon connection is connected to one end of the electronic synapse 305 and a first electronic neuron (e.g., neuron 1) at block 710. A dendritic connection is connected to the other end of the electronic synapse 305 and to a second electronic neuron (e.g., neuron 2) at block 715. An increase and decrease of synaptic conduction in the electronic synapse 305 is based on a probability of switching the multiple bipolar resistors between a low resistance state and a high resistance state at block 720.

Further, via the axon and dendritic connections, voltages received by the multiple bipolar resistors from the first electronic neuron and second electronic neuron cause the switching of the bipolar resistors. The effective probability of switching (one or more of) bipolar resistors is based a delay time between receiving the voltages from the first electronic neuron and second electronic neuron. As the (magnitude of the) delay time increases between receiving a first voltage from the first electronic neuron and receiving a second voltage from the second electronic neuron, the effective probability of switching more of the bipolar resistors to on state (e.g., high resistance state) decreases. As the delay time decreases between receiving the first voltage from the first electronic neuron and receiving the second voltage from the second electronic neuron, the probability of switching more of the bipolar resistors to off state (e.g., low resistance state) decreases.

In one exemplary embodiment, instead of multiple bipolar resistors, the electronic device may include a single bipolar resistor (e.g., bipolar memory device 605) configured to form an electronic synapse (e.g., electronic synapse 305). The single bipolar resistor would operate with probabilistic switching as discussed herein. For example, the single bipolar resistor would be connected as a single bipolar memory device 605 as shown in FIG. 6 except without the additional bipolar memory devices 605 being connected in parallel.

In another exemplary embodiment, instead of the increase and decrease of synaptic conduction in the electronic synapse 305 being based on probabilistic switching, an increase and decrease of synaptic conduction in the electronic synapse 305 may be based on (a resistance of) the bipolar resistors gradually (slowly) changing with each voltage pulse until reaching a final value of resistance. For example, each voltage pulse (combination) via the axon and dendritic connections would cause the bipolar resistors to slowly switch between a low resistance state and a high resistance state (or vice versa), which is the final value of resistance.

Exemplary embodiments may be implemented in hardware, which may include any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" or PLX programming language or other similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for configuring an electronic device to correspond to characteristic features of a biological synapse, comprising:
   arranging a plurality of bipolar resistors in parallel to form an electronic synapse, wherein the plurality of bipolar resistors each have a required switching voltage to switch from one state to another;
   connecting an axon connection to one end of the electronic synapse and to a first electronic neuron; and
   connecting a dendritic connection to another end of the electronic synapse and to a second electronic neuron;
   wherein the plurality of bipolar resistors each have voltages on the axon and dendritic connections that cause a resultant voltage below the required switching voltage for the plurality of bipolar resistors;
   wherein an increase and decrease of synaptic conduction in the electronic synapse is based on an effective probability of switching the plurality of bipolar resistors between a low resistance state and a high resistance state; and
   wherein the resultant voltage for each of the plurality of bipolar resistors is defined as a resultant waveform, in which a first part, being positive, of the resultant waveform corresponds to a first probability of switching to an on state and in which a second part, being negative, of the resultant waveform corresponds to a second probability of switching to an off state.

2. The method of claim 1, wherein, via the axon and dendritic connections, voltages received by the plurality of bipolar resistors from the first electronic neuron and the second electronic neuron cause the switching of the plurality of bipolar resistors.

3. The method of claim 2, wherein the probability of switching the plurality of bipolar resistors is based in a time delay between receiving the voltages from the first electronic neuron and the second electronic neuron.

4. The method of claim 3, wherein as the time delay increases between receiving a first voltage from the first electronic neuron and receiving a second voltage from the second electronic neuron, the effective probability of switching more of the plurality of bipolar resistors to on state decreases.

5. The method of claim 4, wherein as the delay time decreases between receiving the first voltage from the first electronic neuron and receiving the second voltage from the second electronic neuron, the effective probability of switching more of the plurality of bipolar resistors to off state decreases.

6. The method of claim 1, wherein the electronic synapse is connected in series with a diode.

7. The method of claim 6, wherein the diode is configured to limit current conduction in one direction.

* * * * *